(12) United States Patent
Bruhn

(10) Patent No.: US 11,414,066 B2
(45) Date of Patent: Aug. 16, 2022

(54) METHOD AND A CONTROL UNIT FOR CONTROLLING A HYBRID DRIVELINE

(71) Applicant: VOLVO TRUCK CORPORATION, Gothenburg (SE)

(72) Inventor: Andreas Bruhn, Hönö (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 447 days.

(21) Appl. No.: 16/480,726

(22) PCT Filed: Feb. 8, 2017

(86) PCT No.: PCT/EP2017/052736
§ 371 (c)(1),
(2) Date: Jul. 25, 2019

(87) PCT Pub. No.: WO2018/145740
PCT Pub. Date: Aug. 16, 2018

(65) Prior Publication Data
US 2021/0129828 A1 May 6, 2021

(51) Int. Cl.
*B60W 20/16* (2016.01)
*B60W 10/06* (2006.01)
(Continued)

(52) U.S. Cl.
CPC ............ *B60W 20/16* (2016.01); *B60W 10/06* (2013.01); *B60W 10/08* (2013.01);
(Continued)

(58) Field of Classification Search
CPC . B60K 6/48; B60K 2006/4825; B60W 10/06; B60W 10/08; B60W 20/15;
(Continued)

(56) References Cited

U.S. PATENT DOCUMENTS

| 2004/0011030 A1 | 1/2004 | Braun et al. |
| 2011/0197568 A1 | 8/2011 | Beaucaire et al. |
| 2014/0081563 A1 | 3/2014 | Wang et al. |

FOREIGN PATENT DOCUMENTS

| CN | 103661361 A | 3/2014 |
| CN | 104169118 A | 11/2014 |

(Continued)

OTHER PUBLICATIONS

International Search Report and Written Opinion dated Jul. 4, 2017 in International Application No. PCT/EP2017/052736.
(Continued)

*Primary Examiner* — Charles J Han
(74) *Attorney, Agent, or Firm* — Venable LLP; Jeffri A. Kaminski

(57) ABSTRACT

The invention relates to a method and a control unit for controlling a hybrid driveline comprising an internal combustion engine (ICE) and at least one alternative propulsion unit. The method involves monitoring a predetermined first parameter related to vehicle operation and a second parameter related to the state of an exhaust particle filter, wherein
(Continued)

a particle filter regeneration is scheduled when the predetermined second threshold is exceeded. If the first parameter has exceeded or is expected to exceed a predetermined first threshold within a set time period prior to a scheduled particle filter regeneration; then initiation of an on-board diagnostic process is delayed until the particle filter regeneration has been completed. Subsequently, the hybrid driveline is controlled to perform a particulate filter regeneration at the scheduled time and the ICE is operated to perform the on-board diagnostic process.

14 Claims, 4 Drawing Sheets

(51) Int. Cl.
  *B60W 10/08* (2006.01)
  *B60W 50/02* (2012.01)
  *B60W 50/04* (2006.01)
  *F01N 3/023* (2006.01)
  *F01N 11/00* (2006.01)

(52) U.S. Cl.
  CPC ........ *B60W 50/0205* (2013.01); *B60W 50/04* (2013.01); *F01N 3/023* (2013.01); *F01N 11/00* (2013.01); *F01N 2550/04* (2013.01)

(58) Field of Classification Search
  CPC ............. B60W 20/16; B60W 2530/12; B60W 50/0097; B60W 50/0205; B60W 50/04; B60Y 2300/476; F01N 11/00; F01N 2550/04; F01N 2590/11; F01N 2900/08; F01N 3/023; F01N 9/002; F02D 2200/0812; F02D 41/029; F02D 41/22; Y02T 10/40
  See application file for complete search history.

(56) References Cited

FOREIGN PATENT DOCUMENTS

| EP | 2910747 | A1 | 8/2015 | |
|---|---|---|---|---|
| FR | 2979091 | A1 * | 2/2013 | ........... F02D 41/029 |
| FR | 2979091 | A1 | 2/2013 | |
| JP | 2009138643 | A | 6/2009 | |
| WO | 2012147788 | A1 | 11/2012 | |

OTHER PUBLICATIONS

China Office Action dated Nov. 3, 2021 in corresponding China Patent Application No. 201780085734.6, 6 pages.

* cited by examiner

METHOD AND A CONTROL UNIT FOR CONTROLLING A HYBRID DRIVELINE

TECHNICAL FIELD

The invention relates to a method and a control unit for controlling a hybrid driveline comprising an internal combustion engine and an alternative propulsion unit in a vehicle.

The invention can be applied in heavy-duty vehicles, such as trucks, buses and construction equipment. Although the invention will be described with respect to a commercial hybrid vehicle the invention is not restricted to this vehicle, but may also be used in other hybrid vehicles.

BACKGROUND

Vehicles comprising an internal combustion engine (ICE) are as a rule provided with an on-board diagnostic (OBD) system in order to ensure that the ICE is operating correctly and that emission levels are maintain within desired limits. Running an OBD process involves performing a number of tests on ICE and EATS related components wherein various monitors must be passed to ensure proper operation. Such a test usually involves running an algorithm to check and/or compare various sensor readings with stored data to determine the current operational status of a component or process. The test performed are often referred to as a "monitor". If a monitor is not passed, then the OBD system will calculate a ratio between the number of attempted monitors and successful monitors. The ratio should preferably be 10% for 50% of a fleet of vehicles. The OBD system can also set an error code in the form of a diagnostic trouble code (DTC) containing information about some malfunctions and store it in a memory for subsequent retrieval by a technician. Certain error codes will cause generation of an error message to notify the driver directly, usually by turning on a malfunction indicator lamp (MIL) on the dashboard. In some cases, an OBD process can take up to, for example, 2-3 hours to allow all monitors to be passed. This is due to the relatively large number of monitors required in a modern vehicle.

An OBD system monitors some functions every time the ICE is operated, while other functions are checked under certain driving or operating conditions. Some checks are "continuous" or "intermittent" and are ongoing all the time. Continuous checks can be:

Misfire monitoring to detect ignition and fuel related misfires that may cause emissions to increase and/or damage to the catalytic converter.

Fuel system monitoring to detect changes in fuel mixture that may cause emissions to increase.

Comprehensive component monitoring to detect any major faults in engine sensors that may cause emissions to increase.

OBD monitors that only run under certain conditions include, for instance, an evaporative emission control System (EVAP) monitor, a heated exhaust gas oxygen sensor (HEGO) monitor, and a catalyst efficiency monitor. Monitors of this type can take relatively long time to run as they can require particular conditions, e.g. a minimum temperature for one or more components or a predetermined sequence of events.

In conventional ICE driven vehicles, the OBD system can be triggered at regular intervals to perform the latter tests and as the ICE is the only propulsive power source this does not interfere with normal operation of the vehicle.

However, in hybrid vehicles comprising a propulsion system provided with, for instance, an ICE and one or more electric motors it is desirable to reduce emissions by operating the vehicle using electric propulsion whenever possible. In some cases, this can result in non-operation of the ICE over extended periods. Also, when the ICE is operated, the operation can be intermittent and the duration of an operating period can be too short for an OBD process to be completed.

The invention aims to solve the above problems and additionally to provide an improved method for carrying out an OBD process in a hybrid vehicle.

SUMMARY

An object of the invention is to provide a method and a control unit for controlling a hybrid driveline comprising an internal combustion engine and at least one alternative propulsion unit. The method and control unit are used for performing an on-board diagnostic process. The object is achieved by a method and a control unit according to the appended claims.

In the subsequent text, it is stated that the method involves monitoring and registering of a first and a second parameter respectively. The first parameter related to vehicle operation. The term "vehicle operation" can be defined in a number of different ways. According to one definition, vehicle operation is defined as a time or an action performed wherein a driver is operating the vehicle. In order to initiate operation of the vehicle a driver can perform a predetermined action, such as turning an ignition key, or the driver can be identified by the vehicle by a suitable electronic contacting or contact-free means. Subsequently, the vehicle operation ends when the driver parks, leaves and/or locks the vehicle. Examples of parameters for this type of "vehicle operation" can be an accumulated vehicle operating time since the previous on-board diagnostic or an accumulated vehicle mileage since the previous on-board diagnostic. A more specific type of vehicle operation can be ICE operation, where the first parameter can be an accumulated ICE operating/ignition on time or a number of ICE starts since the previous on-board diagnostic. Alternatively, the first parameter can be defined as being related to vehicle operation, where the relevant vehicle operation is an on-board diagnostic. An example of a first parameter for this case is an accumulated time period since the previous on-board diagnostic. In this case, time is counted continuously from a time indicating the start of or the completion of an on-board diagnostic. The second parameter is related to the state of an exhaust particle filter and will be discussed in further detail in the subsequent text.

According to a preferred embodiment, the invention relates to a method to control a hybrid driveline comprising an internal combustion engine (ICE) and at least one alternative propulsion unit. The method comprises at least the steps of;

monitoring a predetermined first parameter related to vehicle operation;

registering if the first parameter has exceeded a predetermined first threshold requiring initiation of an on-board diagnostic process for the ICE;

monitoring a predetermined second parameter related to the state of an exhaust particle filter;

registering if the second parameter has exceeded a predetermined second threshold requiring initiation of a particle filter regeneration;

scheduling a particle filter regeneration when the predetermined second threshold is exceeded;

monitoring if the first parameter has exceeded the predetermined first threshold before the second threshold has been exceeded, and if not;

determining if the first parameter has exceeded or is expected to exceed the predetermined first threshold within a set time period prior to a scheduled particle filter regeneration; and if so, delaying initiation of an on-board diagnostic process until the particle filter regeneration has been completed;

controlling the hybrid driveline to perform a particulate filter regeneration at the scheduled time; and operating the ICE during a predetermined time period and performing the on-board diagnostic process.

In this way, it is possible to delay initiation of the OBD process in order to run it after a scheduled or anticipated particulate filter regeneration. The method avoids forcing the ICE to start and enter a driveline control mode in order to perform an early particulate filter regeneration. By allowing a delay of the OBD process by a set time period it is possible to avoid an undesirable shortening of the time between successive particulate filter regenerations, which will avoid unnecessary engine starts, save fuel, reduce emissions and thus improve the fuel economy.

As indicated above, the method initially involves monitoring if the first parameter has exceeded the predetermined first threshold before the second threshold has been exceeded. If this has occurred, then an OBD process is triggered automatically.

In this case the method carries out the alternative steps of:

determining whether the ICE is currently running or stopped and controlling the hybrid driveline to start the ICE if it is currently stopped;

controlling the hybrid driveline to perform a particulate filter regeneration; and operating the ICE over a predetermined time period and performing the on-board diagnostic process.

These latter steps are carried out directly if it is detected that no particle filter regeneration has been scheduled when the threshold for the first parameter is exceeded. The steps are also carried out if it is determined that the first threshold is exceeded or is expected to be exceeded when the remaining time period up to a scheduled particle filter regeneration exceeds the set time period. One reason for forcing ICE operation to perform a particle filter regeneration can be that ICE emission legislation requires a maximum allowable time between successive on-board diagnostic processes.

The method according to the invention avoids forcing the ICE to start and perform an unnecessary particulate filter regeneration by allowing the OBD process to be delayed by a set time period if it is detected that a particle filter regeneration is scheduled or anticipated within that set time period.

The above-mentioned set time period determining the allowable delay between the time when the first threshold is exceeded and the timing of the start of the scheduled particle filter regeneration can be set by the manufacturer or by the user. The set time period can be selected by the vehicle manufacturer. Examples of a suitable time period can be, for instance, less than 3 months or less than 3 weeks.

According to the method, the ICE is operated during a predetermined time period while performing the on-board diagnostic process. If possible the ICE should be operated in a stable condition during the duration of the OBD process. During the predetermined time period the ICE is preferably prevented from being switched off until the OBD process is completed. In this context, this means that the hybrid vehicle is not allowed to switch to full electric mode while the OBD process is running. This is achieved by using a driveline control mode controlling the at least one alternative propulsion unit to at least limit its output while the OBD process is performed. The predetermined time period varies from vehicle to vehicle and is dependent on the number and type of monitors to be passed.

The predetermined time period can be a cumulative time that runs for a maximum period, or until all monitors are passed. A cumulative time counter for ICE operating time can be interrupted by an ignition key OFF, or by a switch to full electric mode in a mandatory Zero Emission Zone, but is not necessarily reset to zero. It means that the driveline control mode can still be active after the interruption, so in this case the engine will restart and continue the OBD process.

The alternative propulsion unit is a zero emission propulsion unit, which is typically an electric motor. However, within the scope of the invention, the method can also be applied to hybrid vehicles comprising other zero emission propulsion units, such as fluid (hydraulic or pneumatic) propulsion units in a hydrostatic recovery system of kinetic energy, kinetic energy recovery units or a hydrogen ICE.

As indicated above, the predetermined first parameter is related to the operation of the ICE. According to a first example, the predetermined first parameter is an accumulated time period since the previous on-board diagnostic. The accumulated time period can be determined by a continuously running timer in the ECU and stored in a non-volatile memory. The timer is reset after each OBD. According to a second example, the predetermined first parameter is an accumulated vehicle or ICE operating time since the previous on-board diagnostic. The accumulated operating time period can be determined by a timer in the ECU and stored in a non-volatile memory. The timer can be started when it is determined that the vehicle is operated and driven by the ICE and/or the electric motor, and is stopped when vehicle operation ceases. The timer is reset after each OBD. According to a third example, the predetermined first parameter is an accumulated number of ICE starts since the previous on-board diagnostic. The accumulated number of ICE starts can be registered by a counter in the ECU and stored in a non-volatile memory. The counter is reset after each OBD. According to a third example, the predetermined first parameter is an accumulated vehicle mileage since the previous on-board diagnostic. The accumulated mileage can be determined by an odometer or a similar suitable device in the ECU and stored in a non-volatile memory. The accumulated mileage is reset after each OBD. The first parameter can be selected depending on the type of vehicle or its intended use. For instance, for a long-haul vehicle ICE operating time or mileage can be suitable parameters. For a city bus where the ICE is operated intermittently, an accumulated time period or ICE starts since the last OBD can be more relevant.

In addition, the first parameter can be a combination of two or more of the above vehicle related first parameters. For instance, the first parameter can be vehicle mileage, but if the required mileage is not reached within a predetermined time period, then an OBD event is triggered anyway. This can be an alternative if the expected usage of the vehicle changes.

The second parameter is related to the state of an exhaust particle filter, where the state can be the operational state, effectiveness or function of the filter. Exhaust particle filters, such as diesel particulate filters, can accumulate considerable volumes of soot. The collected particulates can eventually cause an excessively high exhaust gas pressure drop in the filter, which would negatively affect the engine operation. Hence, exhaust particulate filter systems must provide a way of removing particulates from the filter to restore its soot collection capacity. Particle filter regeneration can be performed after a pre-determined quantity of soot has been accumulated, which state can be detected using pressure sensors. Thermal regeneration of exhaust particulate filters involves oxidation of the collected particulates by oxygen and/or nitrogen dioxide, converting the particulates to gaseous products, primarily to carbon dioxide. To ensure that particulates are oxidized at a sufficient rate, the filter must operate at a sufficient temperature. In some filter systems, the source of heat is the exhaust gas stream itself. In this type of filter system, referred to as a passive filter, the filter regenerates continuously during the regular operation of the engine. Passive filters usually incorporate some form of a catalyst, which lowers the soot oxidation temperature to a level that can be reached by exhaust gases during the operation of the vehicle. Another approach involves a number of active strategies for increasing the filter temperature, e.g. engine management, fuel combustion in the exhaust system and/or electric heaters. Regeneration of such devices, known as active filters, is usually performed periodically, as determined by the vehicle's control system. Common for both filter types is that thermal regeneration requires energy in the form of fuel.

The invention further relates to a computer program comprising program code means for performing the steps of the method according to the invention when said program is run on a computer.

The invention further relates to a computer program product comprising program code means stored on a computer readable medium for performing the steps of the method according to the invention when said program product is run on a computer.

The invention further relates to a control unit for controlling a hybrid driveline comprising an internal combustion engine (ICE) and at least one alternative propulsion unit, the control unit being configured to perform the steps of the method according to the invention.

The invention further relates to a vehicle, such as a commercial vehicle, comprising a control unit according to the invention.

By the provision of a method and a control unit as described above, it is possible to avoid forcing the ICE to start and performing an early particulate filter regeneration in response to a triggered OBD process. By allowing a delay of the OBD process by a set time period it is possible to avoid an undesirable shortening of the time between successive particulate filter regenerations. One advantage of the invention is that unnecessary thermal regeneration of the particle filter can be avoided, which will save fuel, reduce emissions and improve the fuel economy.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
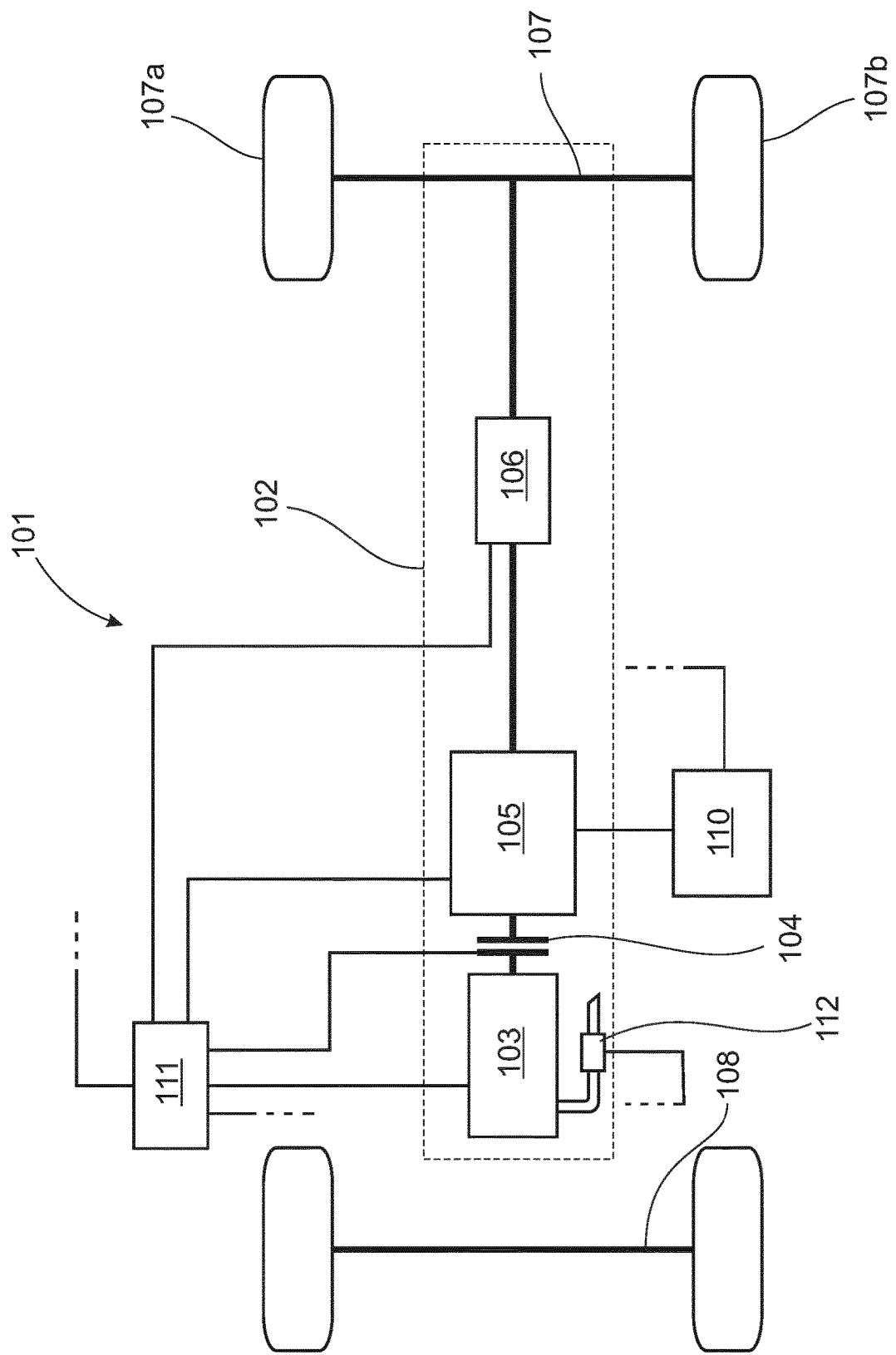
FIG. 1 shows a schematically indicated vehicle with a transmission arrangement for use with a method according to the invention.

FIG. 1 shows a schematic view of a hybrid vehicle 101 with a driven rear axle, although the invention is also applicable to hybrid vehicles in general comprising an electric storage system as described in the subsequent text. The vehicle 101 is provided with a powertrain 102 which comprises an internal combustion engine (ICE) 103, a clutch 104, an electric machine (EM) 105, a gearbox 106, a driven axle 107 connected to a pair of traction wheels 107a, 107b and a steerable front axle 108. The driven axle 107 is connected to an output shaft of the electric machine 105 via the gearbox 106. An output shaft of the ICE 103 is connected to an input shaft of the electric machine 105 via the clutch 104. The vehicle can comprise further driven or non-driven rear axles (not shown in FIG. 1). An electric storage system 110 is provided for supplying or receiving power to/from the electric machine 105 and for supplying power to auxiliary loads in the vehicle. The powertrain 102 is further connected to an electronic control unit (ECU) 111 which is arranged to control the power train 102. The ECU 111 is also connected to relevant sensors and/or other control units for collecting relevant data for the control of the power train 102, e.g. sensors for engine speed, clutch position, gear selection, state of charge (SOC) of the electric storage system 110, exhaust emission levels, diesel particulate filter (DPF) state and other relevant sensors for monitoring the exhaust aftertreatment system (EATS) of the ICE. An ICE exhaust system with a diesel particulate filter 112 comprising a sensor (not shown) connected to the ECU 111 is schematically indicated in FIG. 1. The ECU 111 can also comprise a battery management unit (BMU) for controlling the electric storage system 110 and individual battery storage units (see FIG. 2) making up the electric storage system. A connection between the ECU 111 and the electric storage system 110 is schematically indicated in the figure.

The ECU 111 further comprises circuits and software for performing on-board diagnosis OBD of the ICE 103 using at least the above-mentioned sensors, as well as detected data related to vehicle operation. Vehicle operation data includes parameters such as an accumulated time period since the previous on-board diagnostic, an accumulated vehicle operating time since the previous on-board diagnostic, an accumulated number of ICE starts since the previous on-board diagnostic, and/or an accumulated vehicle mileage since the previous on-board diagnostic. Data relating to the above parameters is collected and stored continuously in an on-board memory unit near or integrated in the ECU 111 for subsequent retrieval and processing upon interrogation during an OBD process.

Figure 2:
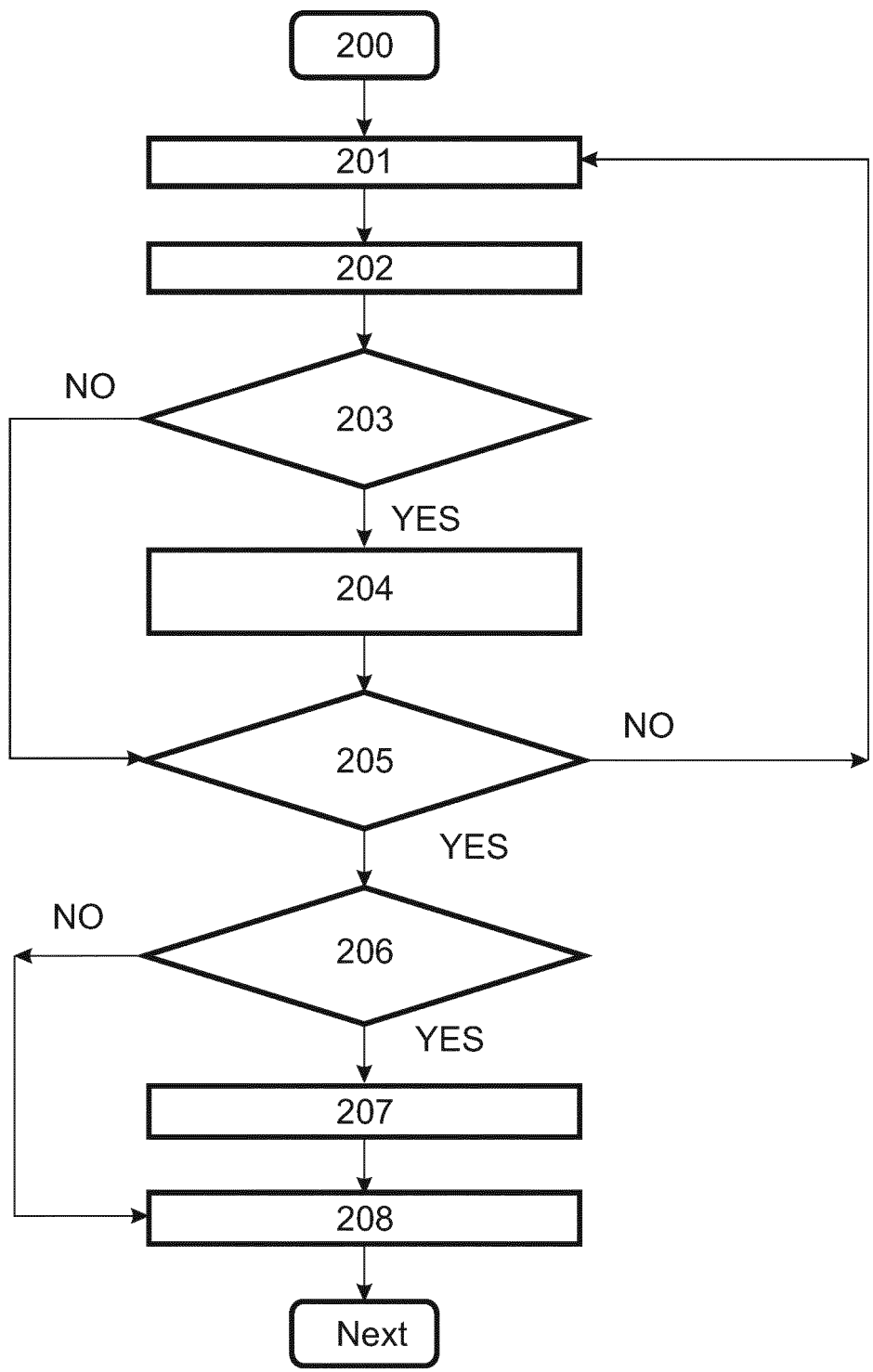
FIGS. 2-3 show flow diagrams for the method steps performed when carrying out the method according to the invention.

FIG. 2 shows a first flow diagram for the method steps performed when carrying out the method according to the invention. The method relates to controlling a hybrid driveline comprising an internal combustion engine (ICE) 103 and at least one alternative propulsion unit, such as an electric motor 105, as described with reference to FIG. 1 above. The method is performed to facilitate on-board diagnostics for the ICE while the vehicle is being operated. According to the diagram in FIG. 2, the method is initiated when the vehicle is started 200, which can involve either electric operation, ICE operation or combined ICE/electric operation.

While the vehicle is being operated a first step 201 involves continuously monitoring a predetermined first parameter P1 related to vehicle operation. During the first step 201 the ECU registers if the first parameter P1 has exceeded a predetermined first threshold T1 requiring the ECU 111 to initiate an on-board diagnostic process for the ICE. When the first threshold T1 is exceeded, the ECU registers the point in time $t_E$ when this occurred. The predetermined first parameter is related to the operation of the ICE. According to a first example, the predetermined first parameter is an accumulated time period since the previous on-board diagnostic. According to a second example, the predetermined first parameter is an accumulated vehicle or ICE operating time since the previous on-board diagnostic. According to a third example, the predetermined first parameter is an accumulated number of ICE starts since the previous on-board diagnostic. According to a third example, the predetermined first parameter is an accumulated vehicle mileage since the previous on-board diagnostic.

Simultaneously, the ECU performs a second step 202 involving continuously monitoring a predetermined second parameter P2 related to the state of an exhaust particle filter 112. During the second step 202 the ECU registers if the second parameter P2 has exceeded a predetermined second threshold T2 requiring the ECU 111 to initiate a particle filter regeneration. The second parameter related to the state of an exhaust particle filter, where the state can be the operational state, effectiveness or function of the filter. According to a first example, the second parameter can be a detected pressure difference across the DPF, wherein a predetermined pressure difference indicates that the filter is clogging up and will require a regeneration. The invention is not limited to this example, but can use any suitable detected parameter indicating that a regeneration is required.

After monitoring and registering the first and second parameters P1, P2, the ECU 111 performs a third step 203 involving monitoring whether the second threshold T2 has been exceeded. If the second threshold T2 has been exceeded the ECU 111 continues to a fourth step 204 and schedules a particle filter regeneration. The scheduling involves setting a point in time $t_P$ in the future when it is determined that a particle filter regeneration is required to maintain a required operating status for the EATS. If the first parameter P2 has not exceeded the predetermined first threshold T2, then the method bypasses the fourth step 204 and proceeds directly to a step 205 to check if the first threshold T1 has been exceeded. If the first threshold T1 has not been exceeded then the ECU returns to the first step 201 and continues to monitor the first and second parameters P1, P2.

However, if the first threshold T1 has been exceeded, the ECU 111 proceeds to a sixth step 206 to determine if the first parameter has exceeded or is expected to exceed the predetermined first threshold T1 at a point in time $t_E$. The ECU then checks if the timing $t_P$ of a scheduled particle filter regeneration occurs within a set time period $\Delta t$ after the time $t_E$. If $(t_P - t_E) \geq \Delta t$, wherein a particle filter regeneration has not been scheduled within the set time period $\Delta t$, then the method bypasses the subsequent steps and proceeds directly to a step 208 involving initiation of driveline control mode for performing a particle filter regeneration and an OBD process. This procedure will be described with reference to FIG. 3 below.

However, if $(t_P - t_E) \leq \Delta t$, wherein a particle filter regeneration has been scheduled within the set time period $\Delta t$, then the method proceeds to a seventh step 207 involving delaying initiation of the on-board diagnostic process until the scheduled particle filter regeneration has been completed. At the point in time $t_P$ when a particle filter regeneration is required, the ECU 111 enters a driveline control mode at step 208, where the driveline is prepared for performing a particulate filter regeneration and an OBD. The subsequent method steps will be described below with reference to FIG. 3.

Figure 3:
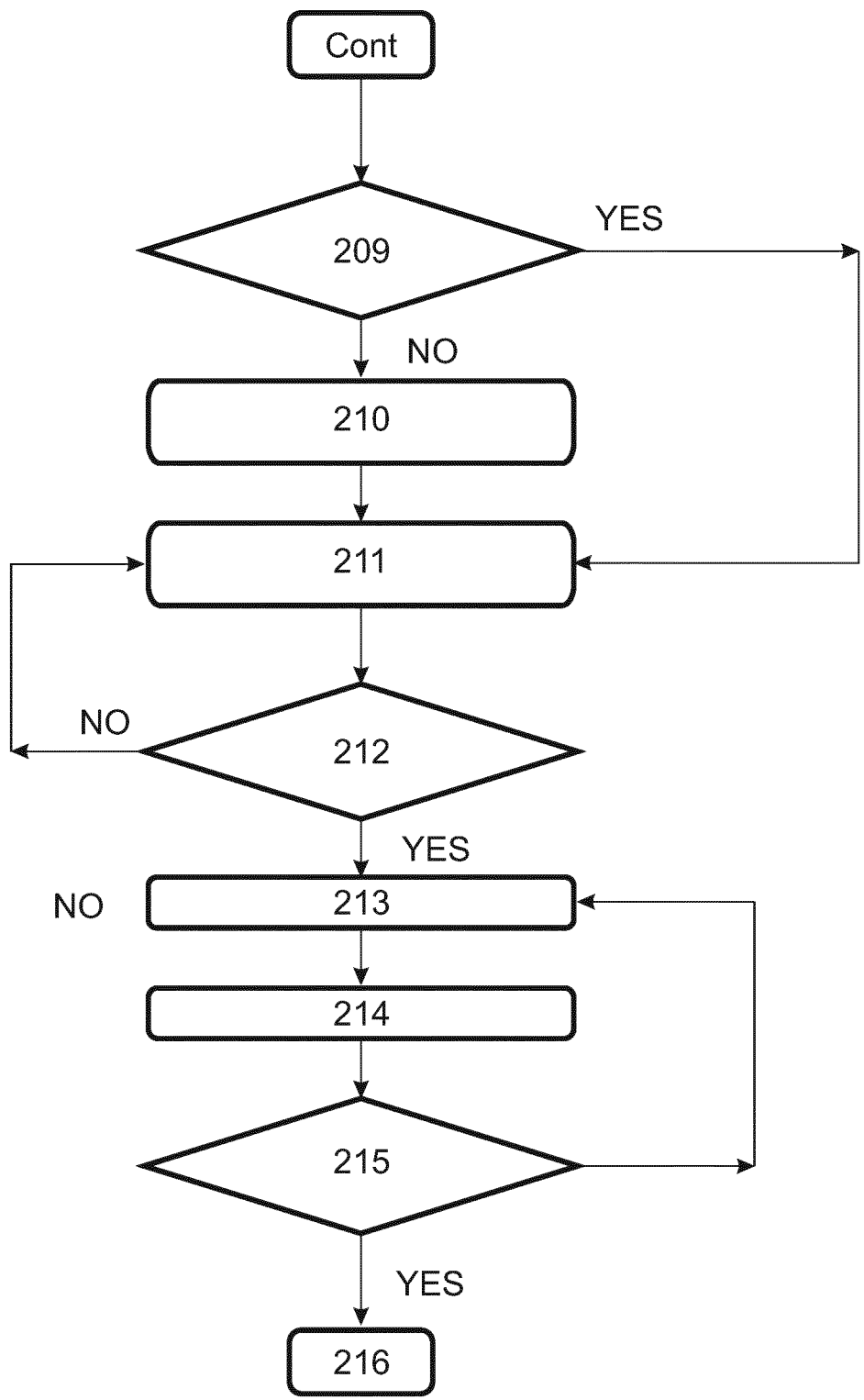

FIG. 3 shows a second flow diagram for the method steps performed subsequent to the steps shown in FIG. 2, when carrying out the method according to the invention. As stated above, the ECU 111 has entered a driveline control mode at step 208 for controlling the hybrid driveline to perform a particulate filter regeneration and a subsequent OBD.

As the vehicle is a hybrid vehicle that can be operated in full electric mode, the ECU 111 will in a ninth step 209 determine whether the ICE 103 is currently running (ICE or hybrid mode) or stopped (full electric mode). If the ICE 103 is currently stopped, the ECU will proceed to a tenth step 210 and control the hybrid driveline to crank and start the ICE. This can be performed by using the electric motor 105 and the clutch 104, or by using a separate starter motor (not shown). If the ICE 103 is currently running, the ECU will bypass the tenth step 210.

In an eleventh step 211 the ICE is operated to warm up the EATS and the associated DPF to a desired temperature. Once the ICE achieves suitable operating conditions, the ECU controls the hybrid driveline to initiate and perform a DPF regeneration. The ECU will then control the ICE and monitor the DPF regeneration process during a twelfth step 212. When it is determined that the DPF regeneration process has been completed the ECU proceeds to a thirteenth step 213 to initiate and run an OBD process. When the OBD process has been initiated the ECU proceeds to a fourteenth step 214, operating the ICE during a predetermined time period to perform the OBD process. Depending on the number and type of monitors to be passed during an OBD, the predetermined time period can be as long as 2-3 hours. The ECU will monitor the OBD process continuously during a fifteenth step 215 and will continue to run the OBD until all monitors have been passed, either successfully or unsuccessfully. When the OBD process has been completed, the ECU proceeds to a final step 216 to end the current process. The ECU will then return to the initial step and continue to monitor the above-mentioned first and second parameters.

During the driveline control mode it is desirable to operate the ICE continuously during a predetermined time period, preferably in a stable condition during, while performing the OBD process. In order to avoid undesirable interruptions of the OBD, the ECU can be arranged to prevent the ICE from being switched off until the on-board diagnostic process has been completed. This can involve controlling the at least one alternative propulsion unit to limit its output at least while the on-board diagnostic process is performed. Some degree of control of the at least one alternative propulsion unit can also be required during a DPF regeneration.

The present invention also relates to a control unit (ECU) for controlling a hybrid driveline comprising an internal combustion engine (ICE) and at least one alternative propulsion unit. The control unit (ECU) shown in FIG. 1 is configured to perform the steps of the method according invention as described above.

The invention further relates to a vehicle, such as a commercial vehicle shown in FIG. 1, comprising a control unit (ECU) according to the invention.

The present invention also relates to a computer program, computer program product and a storage medium for a computer all to be used with a computer for executing the method as described in any one of the above examples.

Figure 4:
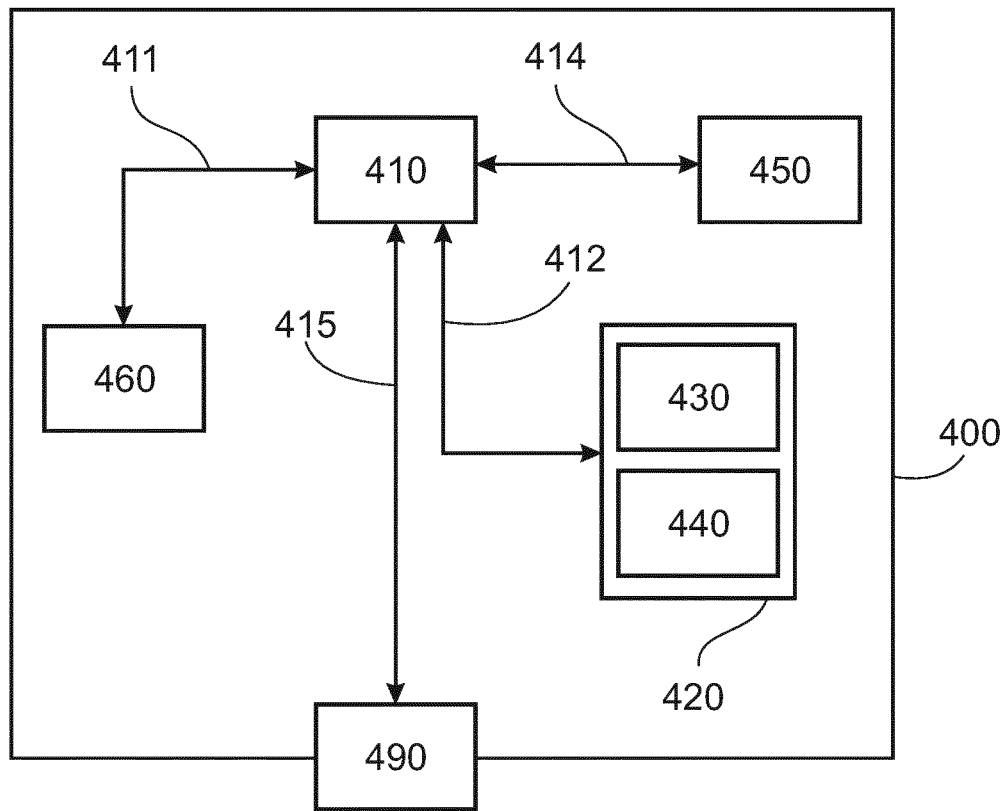
FIG. 4 shows a schematic apparatus used for carrying out the method according to the invention using a computer.

FIG. 4 shows an apparatus 400 according to one embodiment of the invention, comprising a non-volatile memory 420, a processor 410 and a read and write memory 460. The memory 420 has a first memory part 430, in which a computer program for controlling the apparatus 400 is stored. The computer program in the memory part 430 for controlling the apparatus 400 can be an operating system.

The apparatus 400 can be enclosed in, for example, a control unit, such as the control unit 45. The data-processing unit 410 can comprise, for example, a microcomputer. The memory 420 also has a second memory part 440, in which a program for controlling the target gear selection function according to the invention is stored. In an alternative embodiment, the program for controlling the transmission is stored in a separate non-volatile storage medium 450 for data, such as, for example, a CD or an exchangeable semiconductor memory. The program can be stored in an executable form or in a compressed state.

When it is stated below that the data-processing unit 410 runs a specific function, it should be clear that the data-processing unit 410 is running a specific part of the program stored in the memory 440 or a specific part of the program stored in the non-volatile storage medium 420.

The data-processing unit 410 is tailored for communication with the storage memory 420 through a data bus 414. The data-processing unit 410 is also tailored for communication with the memory 420 through a data bus 412. In addition, the data-processing unit 410 is tailored for communication with the memory 460 through a data bus 411. The data-processing unit 410 is also tailored for communication with a data port 490 by the use of a data bus 415.

It is to be understood that the present invention is not limited to the embodiments described above and illustrated in the drawings; rather, the skilled person will recognize that many changes and modifications may be made within the scope of the appended claims.

The invention claimed is:

1. A method of controlling a hybrid driveline of a vehicle, wherein the hybrid driveline comprises an internal combustion engine (ICE), comprising the steps of:
a) monitoring, with a processor of the vehicle, a first parameter related to an operation of the vehicle;
b) registering, with the processor, whether the first parameter has exceeded a predetermined first threshold, wherein the predetermined first threshold indicates that an on-board diagnostic process needs to be performed on the ICE;
c) monitoring, with the processor, a second parameter related to a state of an exhaust particle filter of the vehicle;
d) registering, with the processor, whether the second parameter has exceeded a predetermined second threshold, wherein the predetermined second threshold indicates that the exhaust particle filter needs a regeneration;
e) scheduling, with the processor, the regeneration of the exhaust particle filter, when the predetermined second threshold is exceeded;
f) when the first parameter has exceeded the predetermined first threshold after the predetermined second threshold has been exceeded, performing a delayed on-board diagnostic process by:
determining, with the processor, whether the first parameter has exceeded or is expected to exceed the predetermined first threshold within a set time period prior to the scheduled regeneration of the exhaust particle filter;
when the first parameter has exceeded or is expected to exceed the predetermined first threshold within the set time period prior to the scheduled regeneration of the exhaust particle filter, performing, with the processor, the on-board diagnostic process until the scheduled regeneration of the exhaust particle filter has been completed;
triggering, with the processor, the hybrid driveline to perform the regeneration of the exhaust particulate filter at the scheduled time; and
operating, with the processor, the ICE during a predetermined time period and performing the on-board diagnostic process.

2. The method according to claim 1,
wherein when it is determined that the first parameter has exceeded the predetermined first threshold before the predetermined second threshold has been exceeded, the method comprises:
determining, with the processor, whether the ICE is currently running or stopped;
when the ICE is currently stopped, triggering, with the processor, the hybrid driveline to start the ICE;
triggering, with the processor, the hybrid driveline to perform the regeneration of the exhaust particle filter;
operating, with the processor, the ICE during a predetermined time period; and performing the on-board diagnostic process.

3. The method of claim 1, wherein the ICE is not switched off until the on-board diagnostic process has been completed.

4. The method of claim 1, wherein the hybrid driveline further comprises at least one alternative propulsion unit, and the method further comprising: triggering, with the processor, the at least one alternative propulsion unit to limit its output while the on-board diagnostic process is performed.

5. The method of claim 1, wherein the hybrid driveline further comprises at least one alternative propulsion unit, the at least one alternative propulsion unit is a zero emission propulsion unit.

6. The method of claim 5, wherein the at least one alternative propulsion unit is an electric motor.

7. The method of claim 1, wherein the set time period is less than 3 months.

8. The method of claim 1, wherein the first parameter is an accumulated time period since a previous on-board diagnostic operation.

9. The method of claim 1, wherein the first parameter is an accumulated vehicle operating time since a previous on-board diagnostic operation.

10. The method of claim 1, wherein the first parameter is an accumulated number of ICE starts since a previous on-board diagnostic operation.

11. The method of claim 1, wherein the first parameter is an accumulated vehicle mileage since a previous on-board diagnostic operation.

12. An apparatus of controlling a hybrid driveline of a vehicle, wherein the hybrid driveline comprises an internal combustion engine (ICE), comprising:
a non-volatile memory operable to store computer-readable instructions; and a processor operable to read the computer-readable instructions, when executing the computer-readable instructions, the processor is configured to,
- a) monitor a first parameter related to an operation of the vehicle;
- b) register whether the first parameter has exceeded a predetermined first threshold, wherein the predetermined first threshold indicates that an on-board diagnostic process needs to be performed on the ICE;
- c) monitor a second parameter related to a state of an exhaust particle filter of the vehicle;
- d) register whether the second parameter has exceeded a predetermined second threshold, wherein the predetermined second threshold indicates that the exhaust particle filter needs a regeneration;
- e) schedule the regeneration of the exhaust particle filter, when the predetermined second threshold is exceeded;
- f) when the first parameter has exceeded the predetermined first threshold after the predetermined second threshold has been exceeded, perform a delayed on-board diagnostic process by:
  - determine whether the first parameter has exceeded or is expected to exceed the predetermined first threshold within a set time period prior to the scheduled regeneration of the exhaust particle filter;
  - when the first parameter has exceeded or is expected to exceed the predetermined first threshold within the set time period prior to the scheduled regeneration of the exhaust particle filter, perform the on-board diagnostic process until the scheduled regeneration of the exhaust particle filter has been completed;
  - trigger the hybrid driveline to perform the regeneration of the exhaust particulate filter at the scheduled time; and
  - operate the ICE during a predetermined time period and perform the on-board diagnostic process.

13. A Vehicle comprising the apparatus according to claim 12.

14. A non-transitory computer readable medium, having instructions stored on the computer readable medium, the instructions configured to, when executed, cause a machine to control a hybrid driveline of a vehicle by performing the following operations, wherein the hybrid driveline comprises an internal combustion engine (ICE):
- a) monitoring a first parameter related to an operation of the vehicle;
- b) registering whether the first parameter has exceeded a predetermined first threshold, wherein the predetermined first threshold indicates that an on-board diagnostic process needs to be performed on the ICE;
- c) monitoring a second parameter related to a state of an exhaust particle filter of the vehicle;
- d) registering whether the second parameter has exceeded a predetermined second threshold, wherein the predetermined second threshold indicates that the exhaust particle filter needs a regeneration;
- e) scheduling the regeneration of the exhaust particle filter, when the predetermined second threshold is exceeded;
- f) when the first parameter has exceeded the predetermined first threshold after the predetermined second threshold has been exceeded, performing a delayed on-board diagnostic process by:
  - determining whether the first parameter has exceeded or is expected to exceed the predetermined first threshold within a set time period prior to the scheduled regeneration of the exhaust particle filter;
  - when the first parameter has exceeded or is expected to exceed the predetermined first threshold within the set time period prior to the scheduled regeneration of the exhaust particle filter, performing the on-board diagnostic process until the scheduled regeneration of the exhaust particle filter has been completed;
  - triggering the hybrid driveline to perform the regeneration of the exhaust particulate filter at the scheduled time; and
  - operating the ICE during a predetermined time period and performing the on-board diagnostic process.

* * * * *